United States Patent
Hsing

[11] Patent Number: 6,045,312
[45] Date of Patent: Apr. 4, 2000

[54] FASTENER HAVING PRIMARY AND SECONDARY THREADS

[75] Inventor: John J. Hsing, Glendale Heights, Ill.

[73] Assignee: Illinois Tool Works Inc., Glenview, Ill.

[21] Appl. No.: 09/270,637

[22] Filed: Mar. 17, 1999

[51] Int. Cl.[7] ............................. F16B 23/00; F16B 35/04
[52] U.S. Cl. ........................... 411/412; 411/399; 411/426
[58] Field of Search ................................... 411/399, 412, 411/413, 426

[56] References Cited

U.S. PATENT DOCUMENTS

| | | |
|---|---|---|
| Re. 34,969 | 6/1995 | Dixon et al. . |
| 4,516,893 | 5/1985 | Barth .................................. 411/399 X |
| 4,749,319 | 6/1988 | Sygnator ............................. 411/399 X |
| 4,820,235 | 4/1989 | Weber et al. . |
| 5,292,227 | 3/1994 | Forster et al. . |
| 5,601,553 | 2/1997 | Trebing et al. ..................... 411/413 X |
| 5,779,417 | 7/1998 | Barth et al. ............................... 411/412 |

*Primary Examiner*—Neill Wilson

[57] ABSTRACT

In a fastener having a head and a shank having a generally cylindrical portion with a proximal end adjoining the head and with a distal end, the shank has a primary thread formation and a secondary thread formation. The primary thread formation has a generally uniform radial dimension along the generally cylindrical portion. In one embodiment, the secondary thread formation has a radial dimension tapering outwardly so as to increase continuously from a region where the secondary thread formation originates near the distal end to a region where the secondary thread formation has a maximum radial dimension, which is equal approximately to the generally uniform radial dimension, the latter region being closer to the distal end than to the proximal end. If the secondary thread formation is interrupted, tapping torque is lower, as compared to tapping torque if the secondary thread formation is continuous. In another embodiment, the secondary thread formation has a radial dimension tapering outwardly so as to increase continuously from a region where the secondary thread formation originates near the distal end to a region where the secondary thread formation has a maximum radial dimension, which is less than the generally uniform radial dimension, the latter region being at the proximal end.

14 Claims, 3 Drawing Sheets

FASTENER HAVING PRIMARY AND SECONDARY THREADS

FIELD OF THE INVENTION

This invention pertains to a fastener of a type employed to fasten a sheet-metal plate to a substrate, where the sheet-metal plate may be comparatively thin and the substrate may be comparatively thick. The fastener has a head and a shank, which has a primary thread formation and a secondary thread formation.

BACKGROUND OF THE INVENTION

As exemplified in U.S. Pat. No. 5,779,417 (ITW Case 8048) a fastener of the type noted above is used for fastening a sheet-metal plate, which may be conveniently called a faying plate, to a substrate, which usually is a metal substrate. If the substrate is another sheet-metal plate, the substrate plate may be conveniently called a tapping plate. Commonly, the faying plate is prepared, as by punching, with a hole which may be conveniently called a clearance hole and the substrate is prepared, as by punching or drilling, with a hole which may be conveniently called a tapping hole, and which is smaller in cross-section than the clearance hole. Commonly, the shank is adapted to pass freely through the clearance hole, to enter the tapping hole at a tapered tip, and to tap a complementary thread around the tapping hole, via a self-tapping thread on the shank, when the fastener is driven.

Among other data characterizing a fastener of the type noted above, it is convenient to refer to a tapping torque, which is the torque required for the self-tapping thread to tap the complementary thread when the fastener is driven rotatably. Moreover, it is convenient to refer to a stripping torque, which is the torque required for the self-tapping thread to strip the complementary thread so that the shank rotates freely within the tapping hole.

Commonly, fasteners of the type noted above are produced in large quantities, from which statistically meaningful samples are drawn for testing. Among other data obtainable from testing of any given sample, it is convenient to refer to a statistical maximum tapping torque, which is the maximum torque required for the self-tapping thread of any of the tested fasteners of the sample to tap such a complementary thread. Moreover, it is convenient to refer to a statistical minimum stripping torque, which is the torque required for the self-tapping thread of any of the tested fasteners of the sample to strip the complementary thread so that the shank rotates freely within the tapping hole.

In many applications, such fasteners are driven via pneumatically or electrically powered driving tools, each of which is arranged to apply a driving torque to a fastener head. Desirably, each such tool is adjusted so as to stall or so as to stop driving when a nominal maximum driving torque is applied, which is higher than the statistical maximum tapping torque for such fasteners and lower than the statistical minimum stripping torque for such fasteners. Since such tools tend to be imprecisely adjustable, it is desirable for the statistical minimum stripping torque to be substantially higher than the statistical maximum tapping torque for any given quantity of threaded fasteners of the type noted above.

SUMMARY OF THE INVENTION

This invention provides unique arrangements of thread formations in a fastener of the type noted above. The fastener has a head and a shank, which is unitary with the head and which may have a tapered tip. The shank has a primary thread formation, which defines axially spaced threads along a generally cylindrical portion of the shank, and a secondary thread formation, which defines axially spaced threads between at least some of the threads defined by the primary thread formation. The generally cylindrical portion of the shank has a proximal end adjoining the head and a distal end. The radial dimension of each thread formation is measured radially from the thread root.

In one embodiment contemplated by this invention, the secondary thread formation originates along the generally cylindrical portion of the shank and has a radial dimension that tapers outwardly so as to increase from the region where the secondary thread formation originates to a region where the radial dimension of the secondary thread formation reaches a maximum radial dimension of the secondary thread formation.

Preferably, in the same embodiment, the primary thread formation has a generally uniform radial dimension along the generally cylindrical portion of the shank and the maximum radial dimension of the secondary thread formation is equal approximately to the generally uniform radial dimension of the primary thread formation along the generally cylindrical portion of the shank.

In a modified version of the embodiment discussed in the preceding paragraph, the secondary thread formation is interrupted for an axial length equal to about one pitch, in a region originating about one pitch from the region where the secondary thread formation originates. As compared to an unmodified version, in which the secondary thread formation is continuous, the modified version exhibits lower tapping torque.

In another embodiment contemplated by this invention, the primary thread formation has a generally uniform radial dimension along the generally cylindrical portion of the shank, and the secondary thread formation has a radial dimension that tapers outwardly and continuously so as to increase from a region where the secondary thread formation originates to a region at the proximal end where the radial dimension of the secondary thread formation reaches a maximum radial dimension.

Preferably, in the embodiment discussed in the preceding paragraph, the secondary thread formation originates near the distal end of the generally cylindrical portion of the shank.

These and other objects, features, and advantages of this invention are evident from the following description of two contemplated embodiments of this invention, with reference to the accompanying drawings.

BRIEF DESCRIPTION THE DRAWINGS

DETAILED DESCRIPTION OF THE ILLUSTRATED EMBODIMENTS

Figure 1:
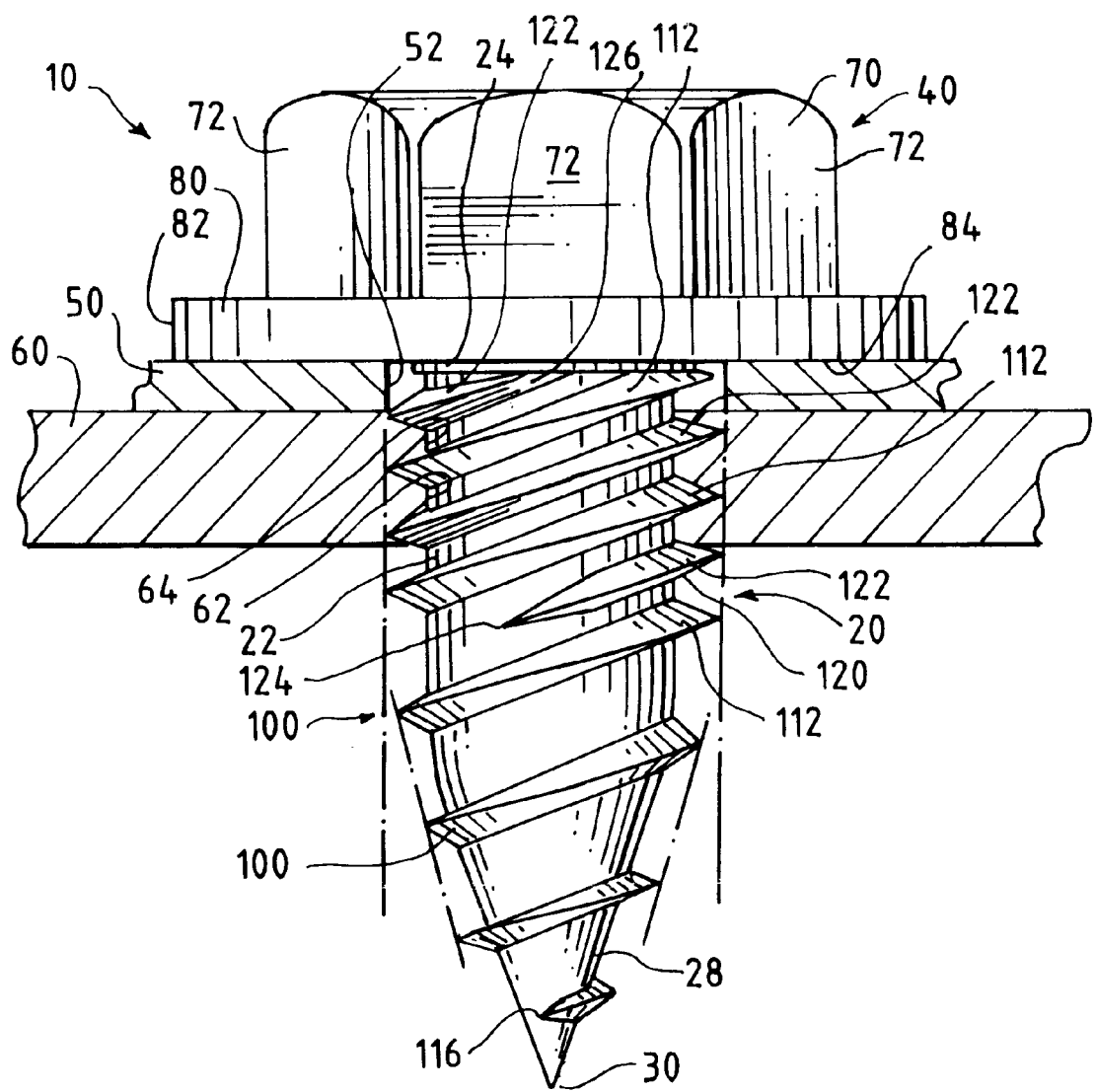
FIG. 1 is an elevational view of a fastener constituting a first embodiment of this invention, along with a faying plate shown fragmentarily in cross-section and along with a substrate shown fragmentarily in cross-section.

As shown in FIG. 1, a fastener 10 of the type noted above constitutes a first embodiment of this invention. Except as illustrated and described herein, the fastener 10 is similar to the fastener disclosed in U.S. Pat. No. 5,779,417 (ITW Case 8048) the disclosure of which is incorporated herein by reference.

The fastener 10 has a shank 20, which defines an axis and which is threaded in a unique manner, and a head 40, which is unitary with the shank 20. The shank 20 has a generally cylindrical portion 22, which has a proximal end 24 adjoining the head 40 and a distal end 26, and a tapered tip 28, which has a rounded end 30 and which adjoins the shank 20 at the distal end 26.

As shown in FIG. 1, the fastener 10 is employed for fastening a faying plate 50, which is prepared, as by punching, with a clearance hole 52, to a substrate 60, which is prepared, as by drilling, with a tapping hole 62. Before the fastener 10 is driven, the clearance hole 52 and the tapping hole 62 are circular, the clearance hole 52 having a comparatively larger diameter and the tapping hole 62 having a comparatively smaller diameter. When the fastener 10 is driven rotatably, the shank 20 is adapted to pass freely through the clearance hole 52, to enter the tapping hole 62 at the tapered tip 28, and to tap a complementary thread 64 around the tapping hole 62.

As shown, the head 40 has a driving portion 70 with a hexagonal shape defining tool-engaging flats 72 whereby the driving portion 70 is adapted to be rotatably driven by a pneumatically powered driving tool (not shown) of a conventional type having a driving head coacting with the tool-engaging flats 72 so as to drive the fastener 10 rotatably about the axis defined by the shank 20. The head 40 has a bearing portion 80 adjoining the shank 20, having an annular, peripheral edge 82, and having a clamping surface 84 facing the tapered tip 28 of the shank 20. In other embodiments (not shown) contemplated by this invention, the head of the fastener may have a different shape, such as the truss or dome shape shown in FIG. 1A. Except as explained herein, the precise shape of the head is outside the scope of this invention.

The shank 20 is formed so as to have a primary thread formation 100, which is continuous, which is self-tapping, and which defines axially spaced threads 112 having a generally uniform radial dimension along the generally cylindrical portion 22 of the shank 20 and similarly spaced threads 114 along the tapered tip 28. The primary thread formation 100 originates at a region 116 near the pointed end 30 of the tapered tip 28 and tapers outwardly toward the distal end 26 of the generally cylindrical portion 22 of the shank 20. The radial dimension of the primary thread formation 100 increases from the region 116, along the tapered tip 28 to the distal end 26 of the generally cylindrical portion 22, until the radial dimension thereof reaches the generally uniform dimension thereof along the generally cylindrical portion 22.

The shank 20 is formed so as to have a secondary thread formation 120, which is continuous, which is self-tapping, and which defines axially spaced threads 122 between some of the threads 112 defined by the primary thread formation 100, along the generally cylindrical portion 22 of the shank 20. The secondary thread formation 120 originates at a region 124 near the distal end 26 of the generally cylindrical portion 22. The secondary thread formation 120 has a radial dimension that tapers outwardly so as to increase continuously over approximately three thread pitches, as shown, from the region 124 to a region 126 on the generally cylindrical portion 22, at which region 126 the radial dimension of the secondary thread formation 120 reaches a maximum radial dimension of the secondary thread formation 120. Being uniform between the region 126 and the proximal end 24 of the generally cylindrical portion 22 of the shank 20, the maximum radial dimension of the secondary thread formation 120 is equal approximately to the generally uniform radial dimension of the primary thread formation 100 along the generally cylindrical portion 22 of the shank 20.

The secondary thread formation 120, which is designed for a range of plate thicknesses and substrate thicknesses, has an axial length that is determined by the combined thicknesses of the faying plate 50 and the substrate 60. With thicker plates and thicker substrates, a greater portion of the axial length of the secondary thread formation 120 is engaged. With thinner plates and thinner substrates, a lesser portion of the axial length of the secondary thread formation 120 is engaged. With thinner plates and thinner substrates, however, the secondary thread formation 120 engages the substrate 60 where the secondary thread formation 120 has tapered outwardly so as to cut deeply into the substrate 60, whereby minimum stripping torque tends to be much greater compared to what the stripping torque would have been if the secondary thread formation 120 were omitted. Preferably, the secondary thread formation 120 has an axial length enabling the fastener 10 to be effectively employed where the faying plate so has a thickness in a range from approximately 0.010 inch to approximately 0.200 inch, commonly from approximately 0.010 inch to approximately 0.035 inch, and where the substrate 60 may have a greater thickness.

Figure 1A:
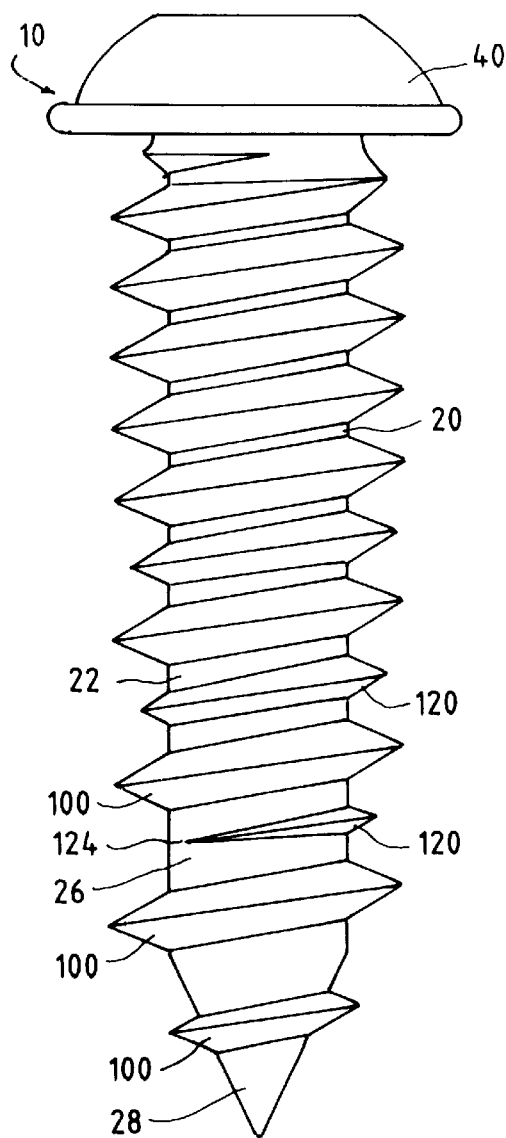
FIG. 1A is a simplified, elevational view of a fastener similar to the fastener shown in FIG. 1, except that the fastener shown is FIG. 1A has a truss or dome head, rather than a hex head, and except that the fastener shown in FIG. 1A has a longer shank.
Figure 2A:
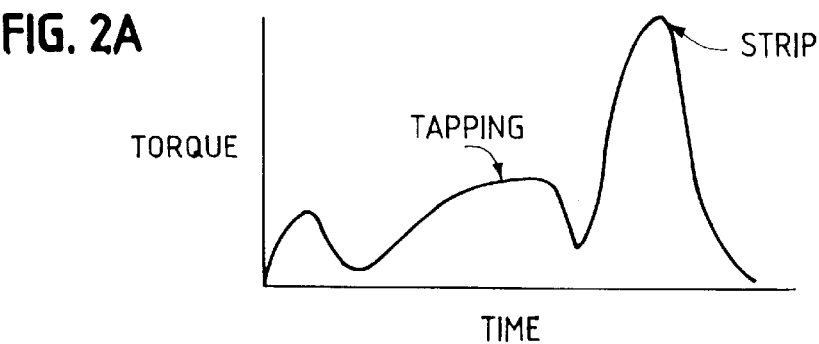
FIG. 2A is a graphical representation of torque versus time for a typical fastener similar to the fastener of FIG. 1A and for a pneumatically powered driving tool, which is not shown.

As represented graphically in FIG. 2A for a typical fastener similar to the fastener shown in FIG. 1A, a wide range is found to exist between the statistically maximum tapping torque and the statistically minimum stripping torque for the respective fasteners when tested by being driven by similar pneumatically powered tools, at similar rotational speeds, through similar workpieces (faying plates and substrates) prepared with similar clearance and tapping holes. It is evident that stripping torque is maximized while tapping torque is minimized.

Figure 1B:
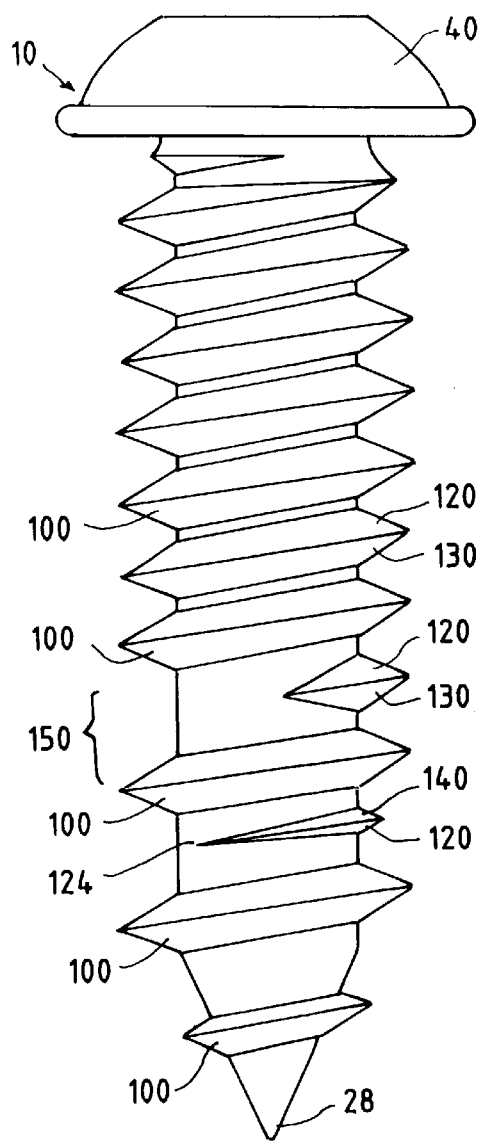
FIG. 1B is a simplified, elevational view of a fastener similar to the fastener shown in FIG. 1A, except that the fastener shown in FIG. 1B has a secondary thread formation that is interrupted, rather than continuous.

As shown in FIG. 1B, in a modified version, the secondary thread formation 120 is interrupted so as to have a portion 130 nearer to the head 40 and a portion 140 nearer to the tip tapered 28 of the shank 20, for an axial length equal to about one pitch. An interrupted portion 150 originates about one pitch closer to the head 40, as measured axially from the region 124 where the secondary thread formation 120 originates, and extends axially toward the head 40 for about one pitch.

Figure 2B:
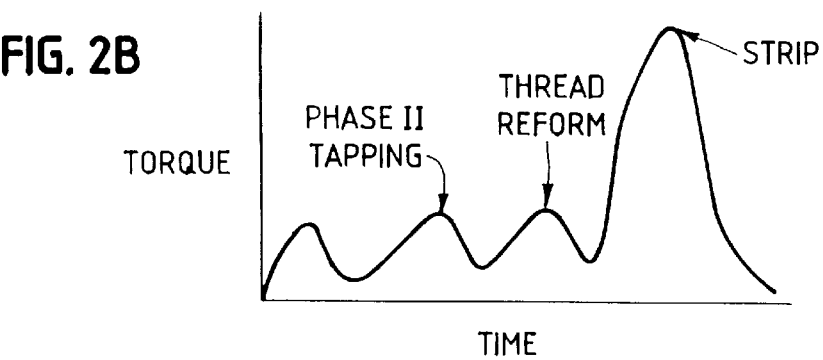
FIG. 2B is a graphical representation of torque versus time for a typical fastener similar to the fastener of FIG. 1B and for a pneumatically powered driving tool, which is not shown.

As represented in FIG. 2B, a typical fastener according to the modified version shown in FIG. 1B exhibits two peaks of tapping torque, each lower than the peak of tapping torque exhibited by a typical fastener according to an unmodified version, in which the secondary thread formation 100 is continuous, as shown in FIG. 1A.

Figure 3:
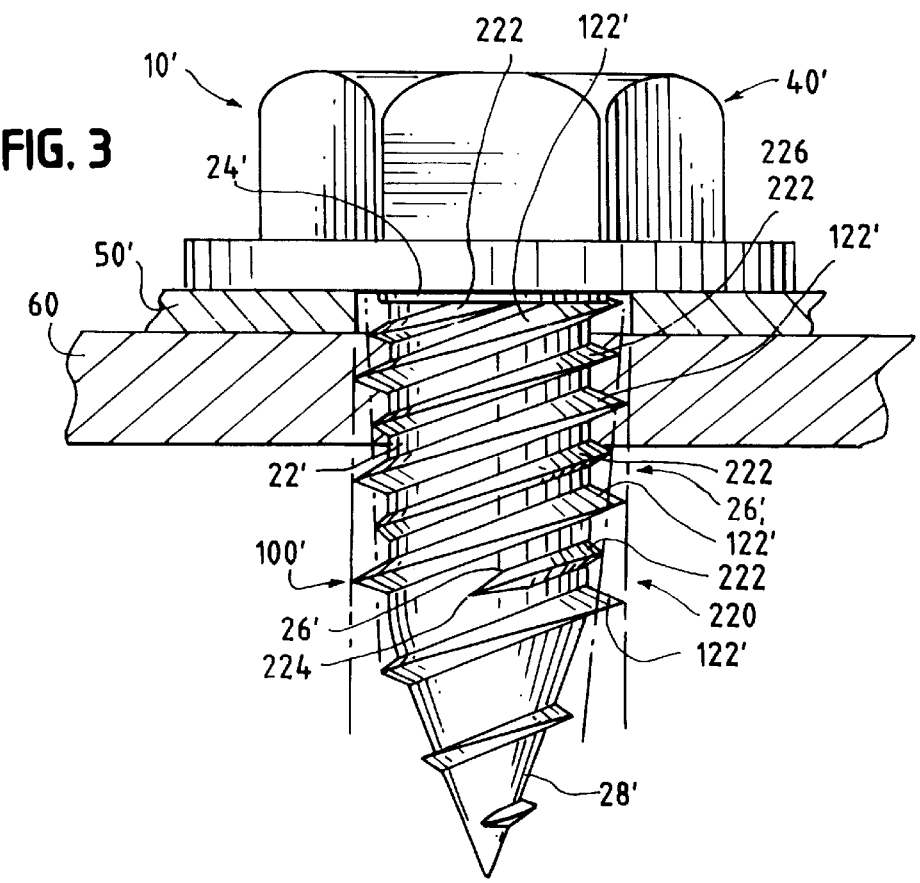
FIG. 3 is an elevational view of a fastener constituting a second embodiment of this invention, along with a faying plate shown fragmentarily in cross-section and along with a substrate shown fragmentarily in cross-section.

As shown in FIG. 3, in which reference numbers with primes refer to elements similar to elements referenced by similar numbers without primes in FIG. 1, a fastener 10' of the type noted above constitutes a second embodiment of this invention. Except as illustrated and described, the fastener 10' is similar to the fastener 10 and can be similarly used to fasten a faying plate 50' to a substrate 60'.

The fastener 10' has a shank 20', which is similar to the shank 20 of the fastener 10, and a head 40', which is similar to the head 40 of the fastener 10. The shank 20' defines an axis and has a generally cylindrical portion 22', which has a proximal end 24' adjoining the head 40' and a distal end 26', and a tapered tip 28'. The shank 20' has a primary thread formation 100', which defines axially spaced threads 122' along the generally cylindrical portion 22' and which has a generally uniform radial dimension along the generally cylindrical portion 22', is similar to the primary thread formation 100 of the shank 20 of the fastener 10. The shank 20' has a secondary thread formation 220, which defines axially spaced threads 222 between some of the threads 122' defined by the primary thread formation 100', differs from the secondary thread formation 120 of the shank 20 of the fastener 10.

The secondary thread formation 220 originates at a region 224 near the distal end 26' of the generally cylindrical portion 22' of the shank 20'. The secondary thread formation 220 has a radial dimension that tapers outwardly so as to increase continuously, as shown, from the region 224 to a region 226 on the generally cylindrical portion 22', at the proximal end 24', at which region 226 the radial dimension of the secondary thread formation 120 reaches a maximum radial dimension, which is less than the generally uniform radial dimension of the primary thread formation 100' along the generally cylindrical portion 22' of the shank 20'.

For a typical fastener similar to the fastener 10', a wide range is predicted to exist between the tapping torque and the stripping torque for the respective fasteners when tested by being driven by similar pneumatically powered tools, at similar rotational speeds, through similar workpieces (faying plates and substrates) prepared with similar clearance and tapping holes.

Various modifications may be made in either embodiment described above without departing from the scope and spirit of this invention.

I claim:

1. A fastener having a head and a shank unitary with the head, the shank defining an axis and having a generally cylindrical portion, the generally cylindrical portion having a proximal end adjoining the head and a distal end, the shank having a primary thread formation and a secondary thread formation, the primary thread formation defining axially spaced threads along the generally cylindrical portion of the shank and having a maximum radial dimension at the proximal end, the secondary thread formation defining axially spaced threads between at least some of the threads defined by the primary thread formation, the secondary thread formation originating along the generally cylindrical portion of the shank and having a radial dimension that tapers outwardly so as to increase continuously from the region where the secondary thread formation originates to a region where the radial dimension of the secondary thread formation reaches a maximum radial dimension of the secondary thread formation, the region where the radial dimension of the secondary thread formation reaches the maximum radial dimension thereof being spaced axially from the proximal end.

2. The fastener of claim 1 wherein the primary thread formation has a generally uniform radial dimension along the generally cylindrical portion of the shank and wherein the maximum radial dimension of the secondary thread formation is equal approximately to the generally uniform radial dimension of the primary thread formation along the generally cylindrical portion of the shank.

3. The fastener of claim 1 wherein the secondary thread formation is continuous.

4. The fastener of claim 1 wherein the secondary thread formation is interrupted.

5. The fastener of claim 4 wherein the secondary thread formation is interrupted for an axial length equal to about one pitch.

6. The fastener of claim 5 wherein the secondary thread formation is interrupted for an axial length equal to about one pitch, in a region originating about one pitch from the region where the secondary thread formation originates.

7. The fastener of claim 1 wherein the secondary thread formation originates near the distal end of the generally cylindrical portion of the shank.

8. A fastener having a head and a shank unitary with the head, the shank defining an axis and having a generally cylindrical portion, the generally cylindrical portion having a proximal end adjoining the head and a distal end, the shank having a primary thread formation and a secondary thread formation, the primary thread formation defining axially spaced threads along the generally cylindrical portion of the shank and having a maximum radial dimension at the proximal end, the secondary thread formation defining axially spaced threads between at least some of the threads defined by the primary thread formation, the secondary thread formation originating along the generally cylindrical portion of the shank and having a radial dimension that tapers outwardly so as to increase continuously from the region where the secondary thread formation originates to a region where the secondary thread formation reaches a maximum radial dimension of the secondary thread formation, the region where the radial dimension of the secondary thread formation reaches the maximum radial dimension thereof being spaced axially from the proximal end, the secondary thread formation being interrupted.

9. The fastener of claim 8 wherein the secondary thread formation is interrupted for an axial length equal to about one pitch.

10. The fastener of claim 9 wherein the secondary thread formation is interrupted for an axial length equal to about one pitch, in a region originating about one pitch from the region where the secondary thread formation originates.

11. A fastener having a head and a shank unitary with the head, the shank defining an axis and having a generally cylindrical portion, the generally cylindrical portion having a proximal end adjoining the head and a distal end, the shank having a primary thread formation and a secondary thread formation, the primary thread formation defining axially spaced threads along the generally cylindrical portion of the shank and having a generally uniform radial dimension along the generally cylindrical portion of the shank, the secondary thread formation defining axially spaced threads between at least some of the threads defined by the primary thread formation, the secondary thread formation having a radial dimension that tapers outwardly and continuously so as to increase continuously from a region where the secondary thread formation originates to a region at the proximal end where the radial dimension of the secondary thread formation reaches a maximum radial dimension, which is less than the generally uniform radial dimension of the primary thread formation along the generally cylindrical portion of the shank, the secondary thread formation being interrupted.

12. A The fastener of claim 11 wherein the secondary thread formation is interrupted for an axial length equal to about one pitch.

13. The fastener of claim 12 wherein the secondary thread formation is interrupted for an axial length equal to about one pitch, in a region originating about one pitch from the region where the secondary thread formation originates.

14. A fastener having a head and a shank unitary with the head, the shank defining an axis and having a generally cylindrical portion, the generally cylindrical portion having a proximal end adjoining the head and a distal end, the shank having a primary thread formation and a secondary thread formation, the primary thread formation defining axially spaced threads along the generally cylindrical portion of the shank and having a generally uniform radial dimension along the generally cylindrical portion of the shank, the secondary thread formation defining axially spaced threads between at least some of the threads defined by the primary thread formation, the secondary thread formation having a radial dimension that tapers outwardly and continuously so as to increase continuously from a region where the secondary thread formation originates to a region at the proximal end where the secondary thread formation reaches a maximum radial dimension, which is less than the generally uniform radial dimension of the primary thread formation along the generally cylindrical portion of the shank, the secondary thread formation originating near the distal end of the generally cylindrical portion of the shank.

\* \* \* \* \*